US009414069B2

(12) United States Patent
Li

(10) Patent No.: US 9,414,069 B2
(45) Date of Patent: Aug. 9, 2016

(54) INTRA FRAME PREDICTION SCANNING METHOD FOR VIDEO CODING AND VIDEO CODING METHOD USING INTRA FRAME PREDICTION SCANNING

(71) Applicant: TENCENT TECHNOLOGY (SHENZHEN) COMPANY LIMITED, Shenzhen, Guangdong Province (CN)

(72) Inventor: Shen-Yuan Li, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 313 days.

(21) Appl. No.: 14/148,680

(22) Filed: Jan. 6, 2014

(65) Prior Publication Data
US 2014/0119444 A1 May 1, 2014

Related U.S. Application Data

(63) Continuation-in-part of application No. PCT/CN2013/074677, filed on Apr. 25, 2013.

(30) Foreign Application Priority Data

May 9, 2012 (CN) .......................... 2012 1 0141238

(51) Int. Cl.
*H04N 11/02* (2006.01)
*H04N 19/91* (2014.01)
(Continued)

(52) U.S. Cl.
CPC ........ *H04N 19/00951* (2013.01); *H04N 19/129* (2014.11); *H04N 19/136* (2014.11); *H04N 19/176* (2014.11)

(58) Field of Classification Search
USPC .......................... 375/240.01–240.29
See application file for complete search history.

(56) References Cited

U.S. PATENT DOCUMENTS 5,283,646 A * 2/1994 Bruder ................. H04N 19/197
341/76
6,532,306 B1 * 3/2003 Boon .................... H04N 19/619
375/E7.133
(Continued)

FOREIGN PATENT DOCUMENTS

CN 101771868 A 7/2010
CN 102017634 A 4/2011
(Continued)

OTHER PUBLICATIONS

Yue Yu, Krit Panusopone, Jian Lou, Limin Wang; "Adaptive Scan for Large Blocks for HEVC"; Joint Collaborative Team on Video Coding (JCT-VC) of ITU-T SG16 WP3 and ISO-IEC JTC1/SC29/WG11, 6th Meeting; Jul. 2011; vol. 14, Issue 22; Torino, Italy.

*Primary Examiner* — Leron Beck
(74) *Attorney, Agent, or Firm* — Cheng-Ju Chiang

(57) ABSTRACT

An intra frame predication scanning method for video coding includes steps of: providing a two-dimensional residual coefficient array of a pixel block; dividing the two-dimensional residual coefficient array into a plurality of sub-arrays; converting, in a predetermined order, residual coefficients in the respective sub-array into a one-dimensional individual-sub-array residual coefficient series; connecting the one-dimensional individual-sub-array residual coefficient series of all the sub-arrays as a one-dimensional all-sub-array residual coefficient series of the pixel block; and performing an entropy coding on the one-dimensional all-sub-array residual coefficient series. A video coding method is also provided.

10 Claims, 4 Drawing Sheets

(51) Int. Cl.
*H04N 19/176* (2014.01)
*H04N 19/129* (2014.01)
*H04N 19/136* (2014.01)

(56) References Cited

U.S. PATENT DOCUMENTS

| | | | | |
|---|---|---|---|---|
| 7,599,840 | B2* | 10/2009 | Mehrotra | G10L 19/0017 341/67 |
| 2003/0048208 | A1* | 3/2003 | Karczewicz | H03M 7/42 341/67 |
| 2003/0112870 | A1* | 6/2003 | Fukuda | H04N 9/7921 375/240.12 |
| 2005/0129320 | A1* | 6/2005 | Koto | H04N 19/147 382/239 |
| 2006/0120450 | A1* | 6/2006 | Han | H04N 19/176 375/240.03 |
| 2009/0226103 | A1 | 9/2009 | Choi et al. | |
| 2012/0093226 | A1* | 4/2012 | Chien | H04N 19/105 375/240.16 |
| 2013/0051690 | A1* | 2/2013 | Kuettel | G06F 17/214 382/232 |

FOREIGN PATENT DOCUMENTS

| | | |
|---|---|---|
| CN | 102065299 A | 5/2011 |
| CN | 1535020 A | 10/2014 |
| WO | 2013/166914 A1 | 11/2013 |

* cited by examiner

| 2 | 0 | 1 | 0 | 0 | 0 | 0 | 0 |
|---|---|---|---|---|---|---|---|
| -5 | -2 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

INTRA FRAME PREDICTION SCANNING METHOD FOR VIDEO CODING AND VIDEO CODING METHOD USING INTRA FRAME PREDICTION SCANNING

CROSS-REFERENCE TO RELATED APPLICATION

This application is a continuation-in-part application of International (PCT) Patent Application No. PCT/CN2013/074677 filed on Apr. 25, 2013, now pending and designating the United States, which also claims benefit of China Patent Application No. 201210141238.7, filed on May 9, 2012. The entirety of the above-mentioned patent applications is hereby incorporated by reference herein and made a part of this specification.

FIELD OF THE INVENTION

The present invention relates to intra frame prediction scanning method for video coding and video coding method, and more particularly to intra frame prediction scanning method for video coding and video coding method with higher efficiency.

BACKGROUND OF THE INVENTION

In video coding, for reducing the spatial redundancy of image and fully utilizing the spatial correlation between a given block and the adjacent blocks in a given frame image, the given block is coded based on the prediction result according to the adjacent blocks. Typically, the prediction result is obtained according to the sequence of the upper-left, left and upper blocks relative to the given block. Because the upper-left, left and upper blocks have been processed before the given block, the bit rate can decrease by directly coding the difference between the predicted value and the actual value.

Due to the pixel blocks have a matrix form and accordingly the associated residual coefficients have a two-dimensional array form, the two-dimensional residual coefficient are required to be converted into a one-dimensional series and then performed by the entropy coding and thereby achieving the compression. In the intra frame prediction encoding process, the compression efficiency of the entropy coding is related to the arrangement characteristic of the one-dimensional residual coefficient series. Specifically, the compression will have a relatively-high efficiency if the nonzero residual coefficients are mainly located in the front part of the one-dimensional residual coefficient series; alternatively, the compression will have a relatively-low efficiency if the nonzero residual coefficients are located randomly in the one-dimensional residual coefficient series, and accordingly the corresponding bit rate is relatively high.

SUMMARY OF THE INVENTION

An embodiment of the present invention provides an intra frame prediction scanning method for video coding, which includes steps of: providing a two-dimensional residual coefficient array of a pixel block; dividing the two-dimensional residual coefficient array into a plurality of sub-arrays; converting, in a predetermined order, residual coefficients in the respective sub-array into a one-dimensional individual-sub-array residual coefficient series; connecting the one-dimensional individual-sub-array residual coefficient series of all the sub-arrays as a one-dimensional all-sub-array residual coefficient series of the pixel block; and performing an entropy coding on the one-dimensional all-sub-array residual coefficient series.

Another embodiment of the present invention provides a video coding method, which includes steps of: providing a frame image; dividing the frame image into a plurality of pixel blocks; performing an intra frame prediction on the pixel blocks by adopting a first intra frame prediction scanning method and a second intra frame prediction scanning method and thereby obtaining a first entropy coding and a second entropy coding, respectively, wherein the first intra frame prediction scanning method includes steps of: providing a two-dimensional residual coefficient array of each pixel block; dividing the two-dimensional residual coefficient array into a plurality of sub-arrays; converting, in a predetermined order, residual coefficients in the respective sub-array into a one-dimensional individual-sub-array residual coefficient series; connecting the one-dimensional individual-sub-array residual coefficient series of all the sub-arrays as a one-dimensional all-sub-array residual coefficient series of the respective pixel block; and obtaining the first entropy coding based on the one-dimensional all-sub-array residual coefficient series; using the first entropy coding, if the first entropy coding has a higher efficiency than that of the second entropy coding, and recording the first intra frame prediction scanning method; or using the second entropy coding, if the second entropy coding has a higher efficiency than that of the first entropy coding, and recording the second intra frame prediction scanning method.

In one embodiment, the sub-arrays corporately form a N×N matrix, each sub-array has a series number $(r-1)*N+c$, wherein r is a row number of the sub-array in the matrix, c is a column number of the sub-array in the matrix, r and c both are an integer selected between 1 and N, wherein the one-dimensional all-sub-array residual coefficient series is obtained by sequentially connecting the one-dimensional individual-sub-array residual coefficient series of the respective sub-arrays in a head-to-tail manner according to the series numbers of the sub-arrays from small to large.

In one embodiment, each sub-array is a M×M matrix, each residual coefficient in the respective sub-array has a series number $((r-1)*N+c-1)*M^2+(e-1)*M+c'$, wherein r' is a row number of the residual coefficient in the respective sub-array, c' is a column number of the residual coefficient in the respective sub-array, r' and c' both are an integer selected between 1 and M, wherein the one-dimensional individual-sub-array residual coefficient series is obtained by converting the residual coefficients therein according to the series numbers of the residual coefficients from small to large.

In one embodiment, the sub-arrays corporately constitute a N×N matrix, each sub-array has a series number $(c-1)*N+r$, wherein r is a row number of the sub-array in the matrix, c is a column number of the sub-array in the matrix, r and c both are an integer selected between 1 and N, wherein the one-dimensional all-sub-array residual coefficient series is obtained by sequentially connecting the one-dimensional individual-sub-array residual coefficient series of the respective sub-arrays in a head-to-tail manner according to the series numbers of the sub-arrays from small to large.

In one embodiment, each sub-array is a M×M matrix, each residual coefficient in the respective sub-array has a series number $((c-1)*N+r-1)*M^2+(c'-1)*M+r'$, wherein r' is a row number of the residual coefficient in the respective sub-array, c' is a column number of the residual coefficient in the respective sub-array, r' and c' both are an integer selected between 1 and M, wherein the one-dimensional individual-sub-array residual coefficient series is obtained by converting the residual coefficients therein according to the series numbers of the residual coefficients from small to large.

DETAILED DESCRIPTION OF PREFERRED EMBODIMENTS

For illustrating the objectives, technical means and advantages of the present invention in a clearer way, the present invention is described with reference to the drawings and embodiments. It is to be understood that the embodiments are used for illustrating the present invention rather than limiting the present invention.

Figures 1, 2:
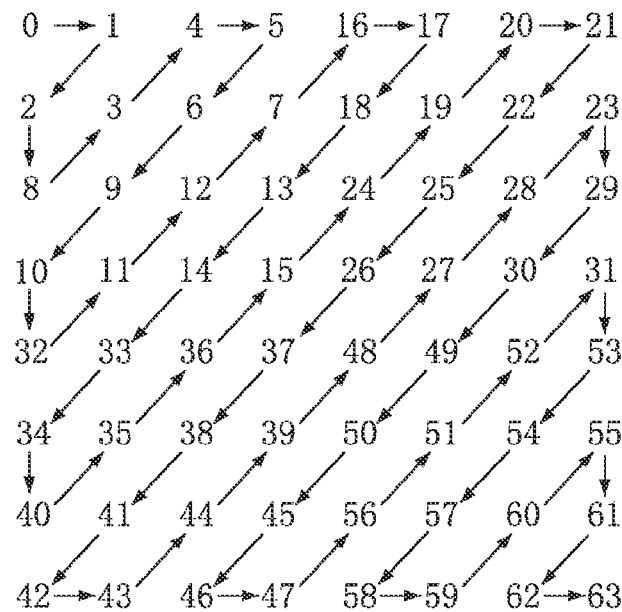
FIG. 1 is a schematic view for illustrating a zig-zag intra frame prediction scanning method.
FIG. 2 is a schematic view of a two-dimensional residual coefficient array corresponding to a 8×8 pixel block.

FIG. 1 is a schematic view for illustrating a zig-zag intra frame prediction scanning method; wherein the method is exemplified by a two-dimensional residual coefficient array corresponding to an 8×8 pixel block. The two-dimensional residual coefficient array includes 64 residual coefficients sequentially numbered from 0 to 63, and each residual coefficient is corresponding to a pixel. As shown in the FIG. 1, the scanning sequence generally has a Z-shape from the upper-left to the lower-right of the array and thereby obtaining a one-dimensional residual coefficient series.

Figures 3, 4:
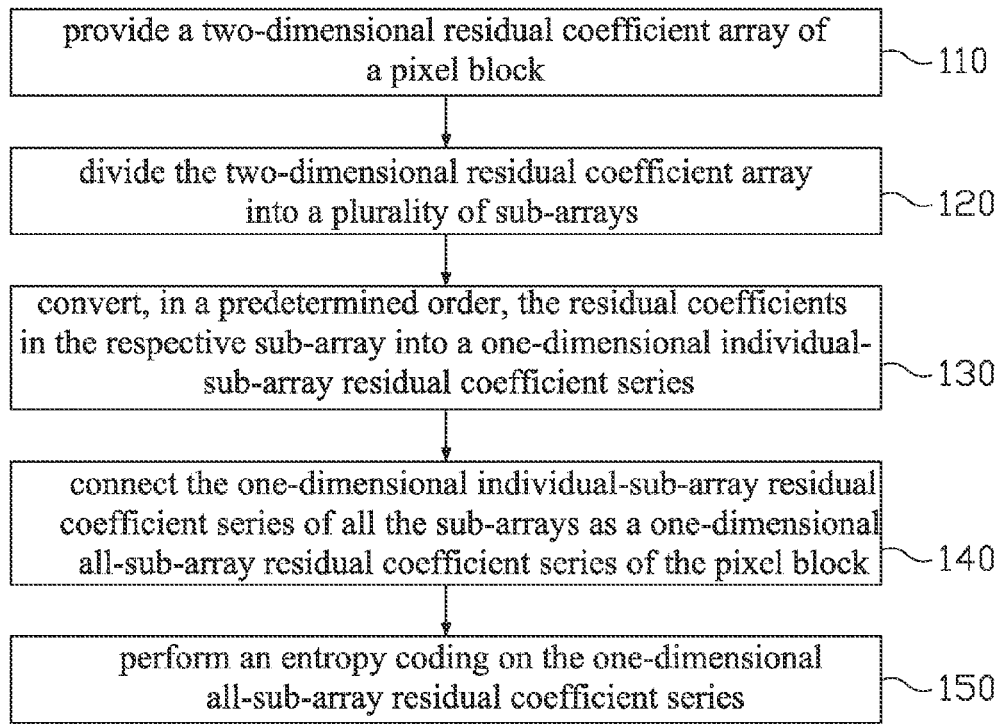
FIG. 3 is a schematic view of a two-dimensional residual coefficient array corresponding to another 8×8 pixel block.
FIG. 4 is a flowchart schematically illustrating an intra frame prediction scanning method for video coding in accordance with the first embodiment of the present invention.

FIG. 2 is a schematic view of a two-dimensional residual coefficient array corresponding to an 8×8 pixel block; wherein a one-dimensional residual coefficient series (2, 0, −5, 0, −2, 1, 0, . . . ) is obtained by adopting the zig-zag intra frame prediction scanning method as illustrated in FIG. 1. FIG. 3 is a schematic view of a two-dimensional residual coefficient array corresponding to another 8×8 pixel block; wherein a one-dimensional residual coefficient series (7, −1, −3, −2, −1, 0, 0, 0, 0, −1, 0, . . . ) is obtained by adopting the zig-zag intra frame prediction scanning method as illustrated in FIG. 1. As shown in FIGS. 2, 3, the nonzero residual coefficients mainly locate at the first two rows and the first two columns, respectively. In addition, as shown in FIG. 2, there exist two zeros between the nonzero residual coefficients in the one-dimensional residual coefficient series (2, 0, −5, 0, −2, 1, 0, . . . ) obtained by the zig-zag intra frame prediction scanning method; and as shown in FIG. 3, there exist four zeros between the nonzero residual coefficients in the one-dimensional residual coefficient series (7, −1, −3, −2, −1, 0, 0, 0, 0, −1, 0, . . . ) obtained by the zig-zag intra frame prediction scanning method.

First Embodiment

FIG. 4 is a flowchart schematically illustrating an intra frame prediction scanning method for video coding in accordance with the first embodiment of the present invention. As shown, the intra frame prediction scanning method in this embodiment includes steps of: providing a two-dimensional residual coefficient array of a pixel block (step 110); dividing the two-dimensional residual coefficient array into a plurality of sub-arrays (step 120); converting, in a predetermined order, the residual coefficients in the respective sub-array into a one-dimensional individual-sub-array residual coefficient series (step 130); connecting the one-dimensional individual-sub-array residual coefficient series of all the sub-arrays as a one-dimensional all-sub-array residual coefficient series of the pixel block (step 140); and performing an entropy coding on the one-dimensional all-sub-array residual coefficient series (step 150).

In an intra frame prediction, generally, the intra frame prediction calculation performed on the current pixel block is based on the upper-left, left or upper pixel blocks relative to the current pixel block. Specifically, the corresponding two-dimensional residual coefficient array is obtained by subtracting the coefficient array of the predicted block from the coefficient array of the current block. Basically, due to the spatial correlation in images, the nonzero coefficients in the two-dimensional residual coefficient array may concentrately locate at the corner thereof as illustrated in FIG. 2 or 3.

Generally, for a pixel block with an 8×8 or 16×16 array, the correspondingly sub-array may be defined to as a 2×2 array. For example, for an 8×8 pixel block, the corresponding two-dimensional residual coefficient array may be divided into 16 2×2 sub-arrays, and the 16 sub-arrays corporately form a 4×4 matrix. For each sub-array, the two-dimensional residual coefficients therein are converted into a one-dimensional individual-sub-array residual coefficient series by being performed by zig-zag scanning sequence as illustrated in FIG. 1. By connecting the one-dimensional individual-sub-array residual coefficient series of all sub-arrays, the one-dimensional all-sub-array residual coefficient series corresponding to the two-dimensional residual coefficient array is obtained.

As described above, the nonzero residual coefficients in two-dimensional residual coefficient array may concentrately locate at the corner thereof as illustrated in FIG. 2 or 3 due to the spatial correlation in images. Thus, by diving the two-dimensional residual coefficient array into a plurality of sub-arrays as described in the aforementioned intra frame prediction scanning method for video coding in accordance with the first embodiment of the present invention, the nonzero coefficients are restricted to be located in some adjacent sub-arrays and accordingly the situation of a relatively-large number of zeros being introduced between the nonzero residual coefficients in the one-dimensional all-sub-array residual coefficient series by the zig-zag scanning sequence as illustrated in FIG. 1 is prevented from occurring; thus, the intra frame prediction scanning method for video coding in the first embodiment of the present invention has higher entropy coding efficiency and lower bit rate.

Second Embodiment

Figure 5:
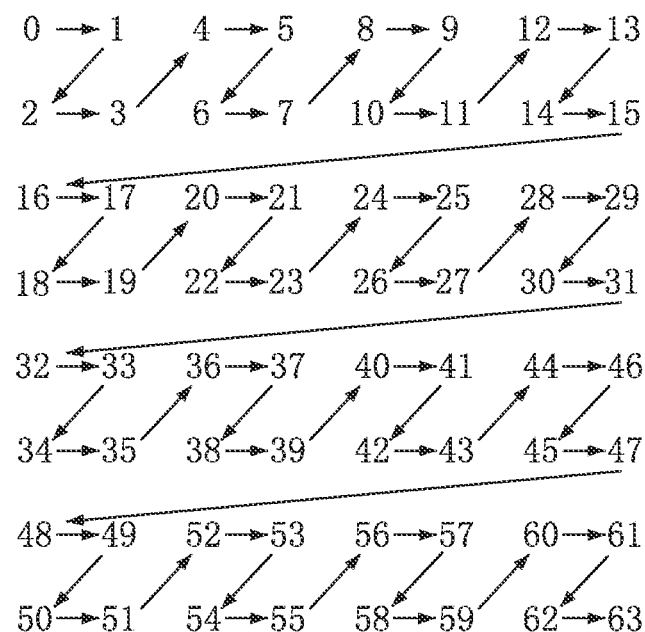
FIG. 5 is a schematic view for illustrating an intra frame prediction scanning method for video coding in accordance with the second embodiment of the present invention.

FIG. 5 is a schematic view for illustrating an intra frame prediction scanning method for video coding in accordance with the second embodiment of the present invention; wherein the exemplary two-dimensional residual coefficient array is corresponding to an 8×8 pixel block. As shown, the two-dimensional residual coefficient array may be divided into 16 2×2 sub-arrays, and the 16 sub-arrays corporately form a 4×4 matrix. Each sub-array is indicated by a series number (r−1)*N+c, wherein N is the column (or row) number of the sub-array matrix, r is the row number of the sub-array in the matrix, and c is the column number of the sub-array in the matrix. In this exemplary embodiment, it is understood that N is 4, r and c both are an integer selected between 1 and N.

For each sub-array, the residual coefficients therein are converted into a one-dimensional individual-sub-array residual coefficient series according to a specific sequence from upper-left, upper-right, lower-left to lower-right as illustrated in FIG. 5. In other words, each residual coefficient in the respective sub-array is indicated by a series number $((r-1)*N+c-1)*M^2+(r'-1)*M+c'$, wherein M is the column (or row) number of the sub-array matrix, r' is the row number of the residual coefficient in the respective sub-array, and c' is the column number of the residual coefficient in the respective sub-array; and accordingly the one-dimensional individual-sub-array residual coefficient series is obtained by connecting the residual coefficients therein according to the series numbers of the residual coefficients from small to large. In this exemplary embodiment, it is understood that M is 4, r' and c' both are an integer selected between 1 and M.

For all sub-arrays, the one-dimensional all-sub-array residual coefficient series may be obtained by connecting all the one-dimensional individual-sub-array residual coefficient series according to the series numbers of the sub-arrays from small to large. For example, the one-dimensional all-sub-array residual coefficient series is obtained by way of sequentially connecting the last residual coefficient in the previous sub-array to the first residual coefficient in the current sub-array and then connecting the last residual coefficient in the current sub-array to the first residual coefficient in the next sub-array. In other words, the one-dimensional all-sub-array residual coefficient series is obtained by way of sequentially connecting the residual coefficients in all the sub-arrays according to the series numbers of the residual coefficients from small to large.

Compared with the residual coefficient series obtained by the conventional zig-zag intra frame prediction scanning method as illustrated in FIG. 1, the one-dimensional all-sub-array residual coefficient series (2, 0, −5, −2, 1, 0, . . . ) obtained by the aforementioned scanning sequence in this embodiment as illustrated in FIG. 2 has one less zero between the nonzero residual coefficients therein. Thus, the one-dimensional all-sub-array residual coefficient series obtained by the intra frame prediction scanning method for video coding in the second embodiment of the present invention has higher entropy coding efficiency.

However, for some specific residual coefficient arrays such as the one illustrated in FIG. 3, the scanning sequence in this embodiment may introduce a relatively-high number of zeros between the nonzero residual coefficients. Thus, the intra frame prediction scanning method in this embodiment is specifically suitable for an array having nonzero residual coefficients concentrating in the first few rows, such as the first two rows of the array shown in FIG. 2.

Third Embodiment

Figure 6:
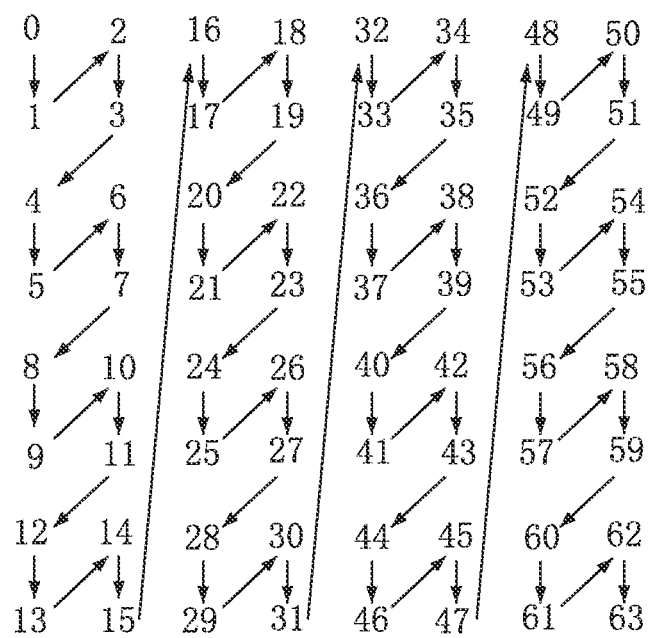
FIG. 6 is a schematic view for illustrating an intra frame prediction scanning method for video coding in accordance with the third embodiment of the present invention.

FIG. 6 is a schematic view for illustrating an intra frame prediction scanning method for video coding in accordance with the third embodiment of the present invention; wherein the exemplary two-dimensional residual coefficient array is corresponding to an 8×8 pixel block. As shown, the two-dimensional residual coefficient array may be divided into 16 2×2 sub-arrays, and the 16 sub-arrays corporately form a 4×4 matrix. Each sub-array is indicated by a series number (c−1)*N+r, wherein N is the column (or row) number of the sub-array matrix, r is the row number of the sub-array in the matrix, and c is the column number of the sub-array in the matrix. In this exemplary embodiment, it is understood that N is 4, r and c both are an integer selected between 1 and N.

For each sub-array, the residual coefficients therein are converted into a one-dimensional individual-sub-array residual coefficient series according to a specific sequence from upper-left, lower-left, upper-right to lower-right as illustrated in FIG. 6. In other words, each residual coefficient in the respective sub-array is indicated by a series number $((c-1)*N+r-1)*M^2+(c'-1)*M+r'$, wherein M is the column (or row) number of the sub-array matrix, r' is the row number of the residual coefficient in the respective sub-array, and c' is the column number of the residual coefficient in the respective sub-array; and accordingly the one-dimensional individual-sub-array residual coefficient series is obtained by connecting the residual coefficients therein according to the series numbers of the residual coefficients from small to large. In this exemplary embodiment, it is understood that M is 4, r' and c' both are an integer selected between 1 and M.

For all sub-arrays, the one-dimensional all-sub-array residual coefficient series may be obtained by connecting all the one-dimensional individual-sub-array residual coefficient series according to the series numbers of the sub-arrays from small to large. For example, the one-dimensional all-sub-array residual coefficient series is obtained by way of sequentially connecting the last residual coefficient in the previous sub-array to the first residual coefficient in the current sub-array and then connecting the last residual coefficient in the current sub-array to the first residual coefficient in the next sub-array. In other words, the one-dimensional all-sub-array residual coefficient series is obtained by way of sequentially connecting the residual coefficients in all the sub-arrays according to the series numbers of the residual coefficients from small to large.

Compared with the residual coefficient series obtained by the conventional zig-zag intra frame prediction scanning method as illustrated in FIG. 1, the one-dimensional all-sub-array residual coefficient series (7, −3, −1, −1, −2, −1, 0, . . . ) obtained by the aforementioned scanning sequence in this embodiment as illustrated in FIG. 3 has four less zeros between the nonzero residual coefficients therein. Thus, the one-dimensional all-sub-array residual coefficient series obtained by the intra frame prediction scanning method for video coding in the third embodiment of the present invention has higher entropy coding efficiency.

However, for some specific residual coefficient arrays such as the one illustrated in FIG. 2, the scanning sequence in this embodiment may introduce a relatively-high number of zeros between the nonzero residual coefficients. Thus, the intra frame prediction scanning method in this embodiment is specifically suitable for an array having nonzero residual coefficients concentrating in the first few columns, such as the first two columns of the array shown in FIG. 3.

It is understood that the three different intra frame prediction scanning methods described above each are specifically suitable for some respective residual coefficient distributions; and most of the existing residual coefficient distributions can be, due to the spatial correlation in images, applied by one of these three intra frame prediction scanning methods disclosed in the embodiments of the present invention. Thus, compared with the prior art, the intra frame prediction scanning method disclosed in the embodiment of the present invention has lower bit rate in video coding.

Fourth Embodiment

Figure 7:
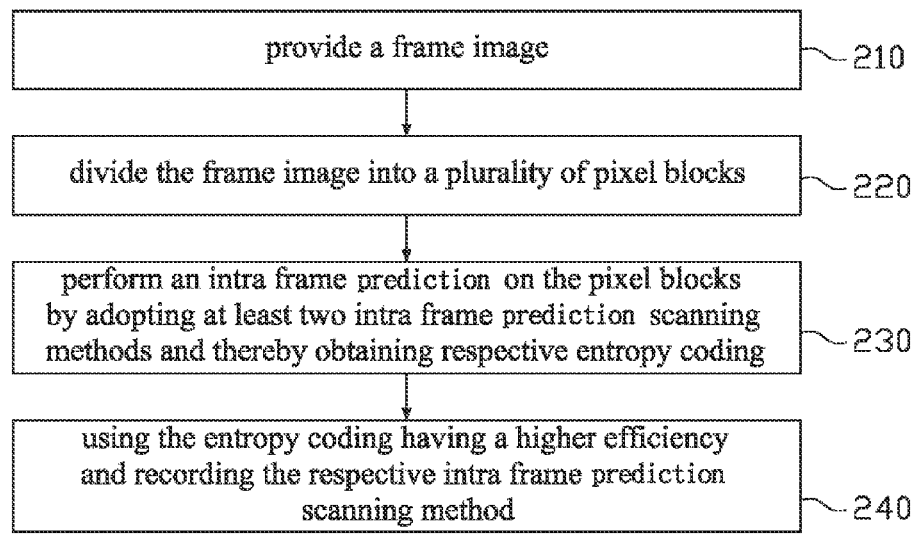
FIG. 7 is a flowchart schematically illustrating an intra frame prediction scanning method for video coding in accordance with the fourth embodiment of the present invention.

In order to further enhance the efficiency of the entropy coding, FIG. 7 illustrates a video coding method in accordance with the fourth embodiment of the present invention, which includes steps of: providing a frame image (step 210); dividing the frame image into a plurality of pixel blocks (step 220); performing an intra frame prediction on the pixel blocks by adopting a first intra frame prediction scanning method and a second intra frame prediction scanning method and thereby obtaining a first entropy coding and a second entropy coding, respectively (step 230), wherein the first intra frame prediction scanning method herein is referred to as the intra frame prediction scanning method disclosed in the first embodiment; using the first entropy coding, if the first entropy coding has a higher efficiency than that of the second entropy coding, and recording the first intra frame prediction scanning method, or, using the second entropy coding, if the second entropy coding has a higher efficiency than that of the first entropy coding, and recording the second intra frame prediction scanning method (step 240).

The description in Steps 210, 220, is well known in the field of video coding, and no redundant detail is to be given herein. It is to be noted that scanning sequences described in the zig-zag intra frame prediction scanning method illustrated in FIG. 1 and the intra frame prediction scanning methods disclosed in the second and third embodiments may be further employed in Step 230 and thereby performing the entropy coding on the obtained one-dimensional all-sub-array residual coefficient series. Afterwards, the entropy coding with the highest efficiency is adopted and the scanning method adopted for the current pixel block is recorded in Step 240. It is understood that the aforementioned three scanning sequences described in the embodiments each can be indicated by two-bit data. For example, the zig-zag intra frame prediction scanning method disclosed with reference to FIG. 1 in the first embodiment is indicated to as 00; the intra frame prediction scanning method disclosed in the second embodiment is indicated to as 01; and intra frame prediction scanning method disclosed in the third embodiment is indicated to as 10. Accordingly, the entropy coding can be restored back to a corresponding two-dimensional residual coefficient array in the decoding end based on the two-bit data.

In the video encoding method of the present embodiment, the entropy coding can have higher efficiency and the video coding can have lower bit rate by using the aforementioned three intra frame prediction scanning methods and selecting the one with the highest entropy coding efficiency. For example, the scanning sequence disclosed in the second embodiment will be used for the residual coefficient distribution shown in FIG. 2; and the scanning sequence disclosed in the third embodiment will be used for the residual coefficient distribution shown in FIG. 3.

In addition, the ordinary skill in the art can understand that all or part of the steps in the aforementioned method embodiments can be realized by related hardware such as a video coding device or a video coding module separately provided or embedded into a computer or equivalent digital data processing device instructed by programs. The corresponding programs can be stored in a readable storage medium of computer, such as a ROM, RAM, disk or optical disk, etc.

What is described above is preferred embodiments according to the present invention only rather than used for limiting the present invention. On the contrary, it is intended to cover various modifications and similar arrangements included within the spirit and scope of the appended claims which are to be accorded with the broadest interpretation so as to encompass all such modifications and similar structures.

What is claimed is:

1. An intra frame prediction scanning method for video coding, comprising steps of:
providing a two-dimensional residual coefficient array of a pixel block;
dividing the two-dimensional residual coefficient array into a plurality of sub-arrays;
converting, in a predetermined order, residual coefficients in the respective sub-array into a one-dimensional individual-sub-array residual coefficient series;
connecting the one-dimensional individual-sub-array residual coefficient series of all the sub-arrays as a one-dimensional all-sub-array residual coefficient series of the pixel block; and
performing an entropy coding on the one-dimensional all-sub-array residual coefficient series;
wherein the sub-arrays corporately form a N×N matrix, each sub-array has a series number $(r-1)*N+c$, wherein r is a row number of the sub-array in the matrix, c is a column number of the sub-array in the matrix, r and c both are an integer selected between 1 and N, wherein the one-dimensional all-sub-array residual coefficient series is obtained by sequentially connecting the one-dimensional individual-sub-array residual coefficient series of the respective sub-arrays in a head-to-tail manner according to the series numbers of the sub-arrays from small to large.

2. The intra frame prediction scanning method according to claim 1, wherein each sub-array is a M×M matrix, each residual coefficient in the respective sub-array has a series number $((r-1)*N+c-1)*M2+(r'-1)*M+c'$, wherein r' is a row number of the residual coefficient in the respective sub-array, c' is a column number of the residual coefficient in the respective sub-array, r' and c' both are an integer selected between 1 and M, wherein the one-dimensional individual-sub-array residual coefficient series is obtained by converting the residual coefficients therein according to the series numbers of the residual coefficients from small to large.

3. An intra frame prediction scanning method for video coding, comprising steps of:
providing a two-dimensional residual coefficient array of a pixel block;
dividing the two-dimensional residual coefficient array into a plurality of sub-arrays;
converting, in a predetermined order, residual coefficients in the respective sub-array into a one-dimensional individual-sub-array residual coefficient series;
connecting the one-dimensional individual-sub-array residual coefficient series of all the sub-arrays as a one-dimensional all-sub-array residual coefficient series of the pixel block; and
performing an entropy coding on the one-dimensional all-sub-array residual coefficient series;
wherein the sub-arrays corporately constitute a N×N matrix, each sub-array has a series number $(c-1)*N+r$, wherein r is a row number of the sub-array in the matrix, c is a column number of the sub-array in the matrix, r and c both are an integer selected between 1 and N, wherein the one-dimensional all-sub-array residual coefficient series is obtained by sequentially connecting the one-dimensional individual-sub-array residual coefficient series of the respective sub-arrays in a head-to-tail manner according to the series numbers of the sub-arrays from small to large.

4. The intra frame prediction scanning method according to claim 3, wherein each sub-array is a M×M matrix, each residual coefficient in the respective sub-array has a series number $((c-1)*N+r-1)*M2+(c'-1)*M+r'$, wherein r' is a row number of the residual coefficient in the respective sub-array, c' is a column number of the residual coefficient in the respective sub-array, r' and c' both are an integer selected between 1 and M, wherein the one-dimensional individual-sub-array residual coefficient series is obtained by converting the residual coefficients therein according to the series numbers of the residual coefficients from small to large.

5. A video coding method, comprising steps of:
providing a frame image;
dividing the frame image into a plurality of pixel blocks;
performing an intra frame prediction on the pixel blocks by adopting a first intra frame prediction scanning method and a second intra frame prediction scanning method and thereby obtaining a first entropy coding and a second entropy coding, respectively, wherein the first intra frame prediction scanning method comprises steps of:
providing a two-dimensional residual coefficient array of each pixel block;
dividing the two-dimensional residual coefficient array into a plurality of sub-arrays;
converting, in a predetermined order, residual coefficients in the respective sub-array into a one-dimensional individual-sub-array residual coefficient series;
connecting the one-dimensional individual-sub-array residual coefficient series of all the sub-arrays as a one-dimensional all-sub-array residual coefficient series of the respective pixel block; and
obtaining the first entropy coding based on the one-dimensional all-sub-array residual coefficient series; and
using the first entropy coding, if the first entropy coding has a higher efficiency than that of the second entropy coding, and recording the first intra frame prediction scanning method; or
using the second entropy coding, if the second entropy coding has a higher efficiency than that of the first entropy coding, and recording the second intra frame prediction scanning method;
wherein in the first intra frame prediction scanning method, the sub-arrays corporately form a N×N matrix, each sub-array has a series number $(r-1)*N+c$, wherein r is a row number of the sub-array in the matrix, c is a column number of the sub-array in the matrix, r and c both are an integer selected between 1 and N, wherein the one-dimensional all-sub-array residual coefficient series is obtained by sequentially connecting the one-dimensional individual-sub-array residual coefficient series of the respective sub-arrays in a head-to-tail manner according to the series numbers of the sub-arrays from small to large.

6. The video coding method according to claim 5, wherein in the first intra frame prediction scanning method, each sub-array is a M×M matrix, each residual coefficient in the respective sub-array has a series number $((r-1)*N+c-1)*M2+(r'-1)*M+c'$, wherein r' is a row number of the residual coefficient in the respective sub-array, c' is a column number of the residual coefficient in the respective sub-array, r' and c' both are an integer selected between 1 and M, wherein the one-dimensional individual-sub-array residual coefficient series is obtained by converting the residual coefficients therein according to the series numbers of the residual coefficients from small to large.

7. A video coding method, comprising steps of:
providing a frame image;
dividing the frame image into a plurality of pixel blocks;
performing an intra frame prediction on the pixel blocks by adopting a first intra frame prediction scanning method and a second intra frame prediction scanning method and thereby obtaining a first entropy coding and a second entropy coding, respectively, wherein the first intra frame prediction scanning method comprises steps of:
providing a two-dimensional residual coefficient array of each pixel block;
dividing the two-dimensional residual coefficient array into a plurality of sub-arrays;
converting, in a predetermined order, residual coefficients in the respective sub-array into a one-dimensional individual-sub-array residual coefficient series;
connecting the one-dimensional individual-sub-array residual coefficient series of all the sub-arrays as a one-dimensional all-sub-array residual coefficient series of the respective pixel block; and
obtaining the first entropy coding based on the one-dimensional all-sub-array residual coefficient series; and
using the first entropy coding, if the first entropy coding has a higher efficiency than that of the second entropy coding, and recording the first intra frame prediction scanning method; or
using the second entropy coding, if the second entropy coding has a higher efficiency than that of the first entropy coding, and recording the second intra frame prediction scanning method;
wherein in the first intra frame prediction scanning method, the sub-arrays corporately constitute a N×N matrix, each sub-array has a series number $(c-1)*N+r$, wherein r is a row number of the sub-array in the matrix, c is a column number of the sub-array in the matrix, r and c both are an integer selected between 1 and N, wherein the one-dimensional all-sub-array residual coefficient series is obtained by sequentially connecting the one-dimensional individual-sub-array residual coefficient series of the respective sub-arrays in a head-to-tail manner according to the series numbers of the sub-arrays from small to large.

8. The video coding method according to claim 7, wherein in the first intra frame prediction scanning method, each sub-array is a M×M matrix, each residual coefficient in the respective sub-array has a series number $((c-1)*N+r-1)*M2+(c'-1)*M+r'$, wherein r' is a row number of the residual coefficient in the respective sub-array, c' is the column number of the residual coefficient in the respective sub-array, r' and c' both are an integer selected between 1 and M, wherein the one-dimensional individual-sub-array residual coefficient series is obtained by converting the residual coefficients therein according to the series numbers of the residual coefficients from small to large.

9. The video coding method according to claim 5, wherein the second intra frame prediction scanning method is zig-zag intra frame prediction scanning method.

10. The video coding method according to claim 7, wherein the second intra frame prediction scanning method is zig-zag intra frame prediction scanning method.

* * * * *